United States Patent
Atkinson et al.

(10) Patent No.: US 9,725,594 B2
(45) Date of Patent: Aug. 8, 2017

(54) REINFORCED FLAME RETARDANT POLYCARBONATE COMPOSITION AND MOLDED ARTICLE COMPRISING SAME

(71) Applicant: SABIC Global Technologies B.V., Bergen op Zoom (NL)

(72) Inventors: Paul Michael Atkinson, West Chester, PA (US); Xiaoyu Sun, Downington, PA (US); Ying Li, Shanghai (CN); Pei Sun, Shanghai (CN); Dake Shen, Shanghai (CN); Huanbing Wang, Shanghai (CN); Hongtao Shi, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 15/033,254

(22) PCT Filed: Sep. 19, 2014

(86) PCT No.: PCT/US2014/056434
§ 371 (c)(1),
(2) Date: Apr. 29, 2016

(87) PCT Pub. No.: WO2015/065611
PCT Pub. Date: May 7, 2015

(65) Prior Publication Data
US 2016/0312025 A1    Oct. 27, 2016

Related U.S. Application Data

(60) Provisional application No. 61/898,803, filed on Nov. 1, 2013, provisional application No. 61/899,094, filed on Nov. 1, 2013.

(51) Int. Cl.
*C08L 69/00* (2006.01)

(52) U.S. Cl.
CPC ............. *C08L 69/00* (2013.01); *C08L 69/005* (2013.01); *C08L 2201/02* (2013.01); *C08L 2205/025* (2013.01); *C08L 2205/03* (2013.01); *C08L 2205/06* (2013.01); *C08L 2207/04* (2013.01)

(58) Field of Classification Search
CPC .... C08L 69/00; C08L 69/005; C08L 2201/02; C08L 2207/04
See application file for complete search history.

(56) References Cited

U.S. PATENT DOCUMENTS

2005/0182165 A1* 8/2005 Ma ....................... C08K 3/0058
524/115

FOREIGN PATENT DOCUMENTS

| CN | 1938383 A | 3/2007 | |
|---|---|---|---|
| CN | 102471569 A | 5/2012 | |
| JP | 2013112752 A | 6/2013 | |
| KR | 20120089436 A | 8/2012 | |
| WO | 2011014778 A1 | 2/2011 | |
| WO | WO 2011/014778 A1 * | 2/2011 | ............ C08L 69/00 |
| WO | 2013175445 A2 | 11/2013 | |

* cited by examiner

*Primary Examiner* — Robert Harlan
(74) *Attorney, Agent, or Firm* — Baker & Hostetler LLP

(57) ABSTRACT

The invention concerns polymer compositions comprising 20-80 weight percent polycarbonate polymer, 15-40 weight percent filler and 4-20% flame retardant and articles comprising same.

20 Claims, No Drawings

REINFORCED FLAME RETARDANT POLYCARBONATE COMPOSITION AND MOLDED ARTICLE COMPRISING SAME

CROSS-REFERENCE TO RELATED APPLICATIONS

This application is the National Stage of International Application No. PCT/US2014/056434, filed Sep. 19, 2014, which claims the benefit of U.S. Provisional Application No. 61/898,803, filed Nov. 1, 2013, and of U.S. Provisional Application No. 61/899,094, filed Nov. 1, 2013, the disclosures of which are incorporated herein by reference in their entireties.

BACKGROUND

The development of improved thermoplastic compositions, e.g., reinforced polycarbonate compositions, with robust flame-retardant properties presents significant technical challenges in discovering compositions that maintain the appropriate balance of modulus, ductility, flow, thin wall flame retardancy and heat resistance. For example, the modulus can be improved with the addition of inorganic fillers, however, the impact toughness will significantly drop compared to unfilled compositions. The use of blended thermoplastic compositions in the application of electrical and electronic fields, especially the consumer electronics industry, increasingly requires compositions able to the meet the stringent requirements pertaining to modulus, flow, appearance, flame retardance, and heat resistance as these compositions are being utilized in applications with thin wall design. In particular, the industry has a strong need for compositions capable of high modulus and high ductility, together with good processability, flawless cosmetics, and thin wall flame retardancy.

Thus, there remains a need for compositions that better manage the appropriate balance of stiffness and ductility while retaining a balanced profile of other properties. Accordingly, it would be beneficial to provide blended thermoplastic resin compositions that have high modulus and high ductility while retaining appropriate balance of other properties such as good processability, good appearance, and thin wall flame retardancy.

SUMMARY

A polymer composition comprises: a polycarbonate polymer present in an amount of about 20 weight % to about 80 weight % relative to the total weight of the polymer composition; a polycarbonate-siloxane copolymer present in an amount of about 1 weight % to about 20 weight % relative to the total weight of the polymer composition; a reinforcing filler present in an amount of about 15 weight % to about 35 weight % relative to the total weight of the polymer composition; and a flame retardant present in an amount of about 4 weight % to about 20 weight % relative to the total weight of the polymer composition, wherein the flame retardant comprises phosphorus, wherein the combined weight percent value of all components does not exceed about 100 wt %.

A method comprises: forming a polymer composition, wherein the polymer composition comprises: a polycarbonate polymer present in an amount of about 20 weight % to about 80 weight % relative to the total weight of the polymer composition; a polycarbonate-siloxane copolymer present in an amount of about 1 weight % to about 20 weight % relative to the total weight of the polymer composition; a reinforcing filler present in an amount of about 15 weight % to about 35 weight % relative to the total weight of the polymer composition; and a flame retardant present in an amount of about 4 weight % to about 20 weight % relative to the total weight of the polymer composition, wherein the flame retardant comprises phosphorus, wherein the combined weight percent value of all components does not exceed about 100 wt %.

A blended thermoplastic composition comprises: about 30 wt % to about 75 wt % of a polycarbonate component; greater than 0 wt % to about 10 wt % of an impact modifier component; about 15 wt % to about 40 wt % of a filler component; about 5 wt % to about 20 wt % of a flame retardant component; and about 0.5 wt % to about 10 wt % of a surface enhancer component; wherein the combined weight percent value of all components does not exceed about 100 wt %; and wherein all weight percent values are based on the total weight of the composition.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

Various combinations of elements of this disclosure are encompassed by this invention, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this invention belongs.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. A value modified by a term or terms, such as "about" and "substantially," is intended to include the degree of error associated with measurement of the particular quantity based upon the equipment available at the time of filing this application. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

Unless otherwise specified herein, any reference to standards, regulations, testing methods and the like, such as ASTM D256, ASTM D638, ASTM D790, ASTM D1238, ASTM D 4812, ASTM 4935, and UL94 refer to the standard, regulation, guidance or method that is in force at the time of filing of the present application.

Disclosed are component materials to be used to prepare disclosed compositions of the invention as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Compounds disclosed herein are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

As used herein, the terms "number average molecular weight" or "Mn" can be used interchangeably, and refer to the statistical average molecular weight of all the polymer chains in the sample and is defined by the formula:

$$Mn = \frac{\sum N_i M_i}{\sum N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art.

As used herein, the terms "weight average molecular weight" or "Mw" can be used interchangeably, and are defined by the formula:

$$Mw = \frac{\sum N_i M_i^2}{\sum N_i M_i},$$

where Mi is the molecular weight of a chain and Ni is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography. In some cases, Mw is measured gel permeation chromatography and calibrated with polycarbonate standards.

The terms "polycarbonate" or "polycarbonates" as used herein includes copolycarbonates, homopolycarbonates and (co)polyester carbonates.

The term polycarbonate can be further defined as compositions have repeating structural units of the formula (1):

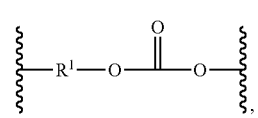

(1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

(2), wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene. Polycarbonate materials include materials disclosed and described in U.S. Pat. No. 7,786,246, which is hereby incorporated by reference in its entirety for the specific purpose of disclosing various polycarbonate compositions and methods for manufacture of same.

As used herein, the term "polycarbonate-polysiloxane copolymer" is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. The polysiloxane-polycarbonate copolymer comprises polydiorganosiloxane blocks comprising structural units of the general formula (13) below:

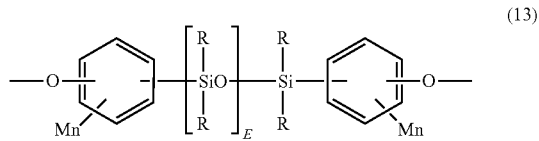

(13)

wherein the polydiorganosiloxane block length (E) is about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (14) below:

(14)

wherein at least 60 percent of the total number of $R^1$ groups comprise aromatic moieties and the balance thereof comprise aliphatic, alicyclic, or aromatic moieties. Polysiloxane-polycarbonates materials include materials disclosed and described in U.S. Pat. No. 7,786,246, which is hereby incorporated by reference in its entirety for the specific purpose of disclosing various compositions and methods for manufacture of same.

Additional components can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, chain extender, colorant (e.g., a dye or pigment), de-molding agents, flow promoter, flow modifier, surface effect additive, radiation stabilizer, flame retardant, anti-drip agent (e.g., a PTFE-encapsulated styrene-acrylonitrile copolymer (TSAN)), or a combination comprising one or more of the foregoing.

In some embodiments, additives such as fillers (including reinforcing fillers), flame retardants, and surface enhancers can be added to the compositions disclosed herein. Exemplary fillers and flame retardants are discussed in U.S. Pat. No. 7,786,246, which is hereby incorporated by reference in its entirety for the specific purpose of disclosing various compositions.

Filler components can include glass beads, glass fiber, glass flakes, mica, talc, clay, wollastonite, zinc sulfide, zinc oxide, carbon fiber (including standard carbon fiber, a performance carbon fiber, or a long carbon fiber), ceramic-coated graphite, titanium dioxide, or combinations thereof. Certain fillers are discussed in US 2014/0107266, which is incorporated herein in its entirety. Certain embodiments comprise carbon fiber and/or blends with carbon fiber, and optionally other fibers.

Flame retardants include phosphorus-containing flame retardants. Examples include phosphazene, aryl phosphate, bisphenol A disphosphate, resorcinol bis-diphenylphosphate, bisphenol A diphenyl phosphate, or resorcinol diphosphate, or a combination thereof. Certain flame retardants are discussed in US 2014/0107266, which is incorporated herein in its entirety.

Impact modifiers include acrylonitrile-butadiene-styrene (ABS) polymer component, methyl methacrylate-butadiene-styrene (MBS) polymer component, bulk polymerized ABS (BABS) polymer, polyolefin elastomer (POE) polymer component, and silicone rubber impact modifier (SAIM) polymer component, and combinations thereof. Certain impact modifiers are discussed in US20140179817 which is incorporated herein in its entirety.

Surface enhancer components include polyesters, a styrenic polymers (such as acrylonitrile butadiene styrene and polystyrene), polysiloxane, organomodified siloxane polymers, polyester, and maleic anhydride grafted ethylene propylene diene monomer (MAH-g-EPDM).

Aspect 1. A polymer composition comprising: a polycarbonate polymer present in an amount of about 20 weight % to about 80 weight % relative to the total weight of the polymer composition; a polycarbonate-siloxane copolymer present in an amount of about 1 weight % to about 20 weight % relative to the total weight of the polymer composition; a reinforcing filler present in an amount of about 15 weight % to about 35 weight % relative to the total weight of the polymer composition; and a flame retardant present in an amount of about 4 weight % to about 20 weight % relative to the total weight of the polymer composition, wherein the flame retardant comprises phosphorus.

Aspect 2. The polymer composition Aspect 1, wherein the polycarbonate polymer comprises an aromatic polycarbonate, a polycarbonate-sebacic acid copolymer, or a branched polycarbonate, or a combination thereof, in an amount of about 5 weight % to about 30 weight % relative to the total weight of the polymer composition.

Aspect 3. The polymer composition of Aspect 1 or 2, wherein the reinforcing filler comprises a standard carbon fiber, a performance carbon fiber, or a long carbon fiber, or a combination thereof; and, optionally, glass fiber.

Aspect 4. The polymer composition of any of Aspects 1-3, wherein the flame retardant comprises phosphazene, aryl phosphate, bisphenol A disphosphate, resorcinol bis-diphenylphosphate, bisphenol A diphenyl phosphate, or resorcinol diphosphate, or a combination thereof.

Aspect 5. The polymer composition of any of Aspects 1-4, further comprising talc present in an amount of about 0.1 weight % to about 5 weight % relative to the total weight of the polymer composition.

Aspect 6. The polymer composition of any of Aspects 1-5, wherein the polymer composition demonstrates a flexural modulus in an amount equal to or greater than about 10 GigaPascals (GPa).

Aspect 7. A method comprising: forming a blend polymer composition, wherein the blend polymer composition comprises: a polycarbonate polymer present in an amount of about 20 weight % to about 80 weight % relative to the total weight of the polymer composition; a polycarbonate-siloxane copolymer present in an amount of about 1 weight % to about 20 weight % relative to the total weight of the polymer composition; a reinforcing filler present in an amount of about 15 weight % to about 35 weight % relative to the total weight of the polymer composition; and a flame retardant present in an amount of about 4 weight % to about 20 weight % relative to the total weight of the polymer composition, wherein the flame retardant comprises phosphorus.

Aspect 8. The method of Aspect 7, wherein the polycarbonate polymer comprises an aromatic polycarbonate, a polycarbonate-sebacic acid copolymer, or a branched polycarbonate, or a combination thereof, in an amount of about 5 weight % to about 30 weight % relative to the total weight of the polymer composition.

Aspect 9. The method of Aspect 7 or 8, wherein the reinforcing filler comprises a standard carbon fiber, a performance carbon fiber, or a long carbon fiber, or a combination thereof and, optionally, glass fiber Aspect 10. The method of any of Aspects 7-9, wherein the flame retardant comprises phosphazene, aryl phosphate, bisphenol A disphosphate, resorcinol bis-diphenylphosphate, bisphenol A diphenyl phosphate, or resorcinol diphosphate, or a combination thereof.

Aspect 11. The method of any of Aspects 7-10, wherein the blend polymer composition demonstrates a flexural modulus in an amount equal to or greater than about 10 GPa.

Aspect 12. The composition of any of Aspects 1-11, wherein a molded sample comprising the composition has a notched Izod impact strength greater than or equal to about 60 Joules per meter (J/m) when tested in accordance with ASTM D256 (greater than or equal to 100 J/m in some embodiments).

Aspect 13. The composition of any of Aspects 1-12, being capable of achieving UL94 V0 rating at a thickness of about 0.8 millimeters (mm) to about 1.0 mm.

Aspect 14. A blended thermoplastic composition comprising: about 30 wt % to about 75 wt % of a polycarbonate component; greater than 0 wt % to about 10 wt % of an impact modifier component; about 15 wt % to about 40 wt % of a filler component; about 5 wt % to about 20 wt % of a flame retardant component; and about 0.5 wt % to about 10 wt % of a surface enhancer component; wherein the combined weight percent value of all components does not exceed about 100 wt %; and wherein all weight percent values are based on the total weight of the composition.

Aspect 15. The composition of Aspect 14, wherein the polycarbonate component is a homopolymer comprising repeating units derived from bisphenol-A.

Aspect 16. The composition of Aspect 14 or 15, wherein the polycarbonate has a weight average molecular weight of about 15,000 to about 50,000 grams/mole, as measured by gel permeation chromatography using bisphenol-A polycarbonate standards.

Aspect 17. The composition of Aspect 14, wherein the polycarbonate component comprises a branched chain polycarbonate.

Aspect 18. The composition of any of Aspects 14-17, wherein the polycarbonate component comprises a blend of at least two polycarbonate polymers.

Aspect 19. The composition of any of Aspects 14-18, wherein the polycarbonate component comprises at least one low flow polycarbonate component having a melt volume flow rate (MVR) of at least about 3.0 cm$^3$/10 minutes when measured at 300° C. and under a load of 1.2 kg according to ASTM D1238.

Aspect 20. The composition of any of Aspects 14-19, wherein the surface enhancer component comprises a polyester, a styrenic polymer, or an organomodified siloxane.

Aspect 21. The composition of any of Aspects 14-20, wherein the impact modifier component comprises at least one acrylonitrile-butadiene-styrene (ABS) polymer component, at least one methyl methacrylate-butadiene-styrene (MBS) polymer component, at least one bulk polymerized ABS (BABS) polymer, at least one polyolefin elastomer (POE) polymer component, or at least one silicone rubber impact modifier (SAIM) polymer component, or combinations thereof.

Aspect 22. The composition of any of Aspects 14-21, wherein the flame retardant component comprises a phosphorus-containing flame retardant.

Aspect 23. The composition of any of Aspects 14-22, wherein the filler component is selected from glass beads, glass fiber, glass flakes, mica, talc, clay, wollastonite, zinc sulfide, zinc oxide, carbon fiber, ceramic-coated graphite, titanium dioxide, or combinations thereof.

Aspect 24. The composition of any of Aspects 14-23, further comprising at least one additive selected from an anti-drip agent, antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer, or combinations thereof.

Aspect 25. The composition of any one of Aspects 14-24 comprising: about 40 wt % to about 60 wt % of a polycarbonate component; greater than 0 wt % to about 10 wt % of an impact modifier component; about 20 wt % to about 35 wt % of a filler component; about 5 wt % to about 20 wt % of a flame retardant component; and about 2 wt % to about 7 wt % of a surface enhancer component; wherein the combined weight percent value of all components does not exceed about 100 wt %; and wherein all weight percent values are based on the total weight of the composition.

Aspect 26. The composition of any one of Aspects 14-25 comprising: about 30 wt % to about 75 wt % of a polycarbonate component; greater than 0 wt % to about 10 wt % of an impact modifier component; about 15 wt % to about 40 wt % of a filler component; about 5 wt % to about 20 wt % of a flame retardant component; and about 0.5 wt % to about 10 wt % of a surface enhancer component; wherein the combined weight percent value of all components does not exceed about 100 wt %; wherein all weight percent values are based on the total weight of the composition.

Aspect 27. The composition of any of Aspects 14-26, wherein the blended thermoplastic composition has a notched Izod impact strength greater than or equal to about 60 J/m when tested in accordance with ASTM D256.

Aspect 28. The composition of any of Aspects 14-27, wherein a molded sample comprising the blended thermoplastic composition is capable of achieving UL94 V0 rating at a thickness of 1.0 mm (±10%).

Aspect 29. The composition of any of Aspects 14-27, wherein a molded sample comprising the blended thermoplastic composition is capable of achieving UL94 V0 rating at a thickness of 1.5 mm (±10%).

Aspect 30. The composition of any of Aspects 14-29, wherein a molded sample comprising the blended thermoplastic composition has a flexural modulus greater than or equal to about 5000 MegaPascals (MPa) when tested in accordance with ASTM D790.

Aspect 31. The composition of any of Aspects 14-31, wherein a molded sample comprising the blended thermoplastic composition has having a melt flow rate (MFR) of greater than or equal to about 8 g/10 min (grams per minute) when tested in accordance with ASTM D1238 at 260° C. under a load of 2.16 kilograms (kg).

Aspect 32. An article comprising any of the compositions of Aspects 1-31.

Aspect 33. The article of Aspect 32, wherein the article is molded.

Aspect 34. The article of Aspect 33, wherein the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device and RFID device.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in degrees Celsius (° C.) or is at ambient temperature, and pressure is at or near atmospheric.

Molded articles were prepared for analysis using conventional compounding and molding techniques. The molded articles were compounded at a temperature of 500° F. to 580° F. (260° C. to 304° C.).

A notched Izod impact ("NII") test was carried out on 63.5 mm×12.7 mm×3.18 mm molded samples (bars) according to ASTM D 256 at 23° C. Test samples were conditioned in ASTM standard conditions of 23° C. and 55% relative humidity for 48 hours and then were evaluated. NII was determined using a Ceast Impact Tester.

An unnotched Izod impact test was carried out on molded parts (bars) according to ASTM D 4812 at 23° C. Test specimen was conditioned at ASTM standard conditions of 23° C. and 55% relative humidity for 48 hours and then evaluated. Flexural properties (modulus and strength) were measured using 3.2 mm bars in accordance with ASTM D 790. Flexural strength (in units of MPa) and flexural modulus (in units of MPa) are reported at yield. Tensile properties (modulus, strength, and strength at yield) were measured on 3.2 mm bars in accordance with ASTM D 638. Tensile strength (for either at break or at yield, in units of MPa), tensile modulus (in units of MPa), and tensile elongation (%) are reported at break. Flame retardant properties were measured in accordance with UL94 flammability. Specific gravity properties were measured using ASTM D792.

Examples 1-6

As a non-limiting example, sample compositions were prepared from the components described in Table 1. The performance of the sample compositions of polycarbonate (bisphenol-A polycarbonate), polycarbonate-siloxane copolymer (polycarbonate-siloxane block copolymer with 20% siloxane content), and carbon fibers were tested with and without the addition of resorcinol diphosphate as a flame retardant comprising phosphorus. The performance of the sample compositions were also tested with and without the addition of talc. The samples also included a drip suppressant concentrate comprising polytetrafluoroethylene (PTFE). The sample compositions were produced through extrusion compounding, with the carbon fiber provided as chopped feedstock. The sample compositions demonstrated acceptable ductility and strength as measured by the flexural strength and the flexural modulus. Specific gravity was measured to characterize the sample.

Table 1 provides a performance comparison of comparative examples 1-3 and inventive examples 4-6. The flame retardant properties were measured using the UL94 flammability test with a sample width of 1.0 mm. A rating of V-0 demonstrates that the sample passed the UL94 test protocol; whereas a rating of NR demonstrates that the sample did not pass the UL94 test protocol by achieving any of the ratings allowed for by the UL94 test protocol.

TABLE 1

| Sample characteristics | Units | 1 | 2 | 3 | 4 | 5 | 6 |
|---|---|---|---|---|---|---|---|
| Polycarbonate | % | 53.9 | 61.6 | 53.9 | 50 | 48 | 50 |
| PC-siloxane copolymer | % | 15.6 | 17.8 | 15.5 | 14.4 | 13.9 | 14.4 |
| Carbon fiber, performance | % | 20 | 20 | 30 | 20 | 20 | 20 |
| Sulfonate salt | % | | 0.3 | 0.3 | | | |
| Resorcinol diphosphate | % | 10 | | | 12.5 | 12.5 | 15 |
| Talc | % | | | | 2.5 | 5 | |
| Drip suppressant concentrate | % | 0.5 | 0.3 | 0.3 | 0.6 | 0.6 | 0.6 |
| Specific gravity | — | 1.3 | 1.262 | 1.31 | 1.32 | 1.34 | 1.31 |
| Flexural strength | MPa | 237 | 263 | 286 | 275 | 278 | 262 |
| Flexural modulus | MPa | 18400 | 16200 | 21100 | 19300 | 20000 | 17000 |
| UL94 flammability @ 1.0 mm | | NR | NR | NR | V-0 | V-0 | V-0 |

Examples 7-11

As a non-limiting example, sample compositions were prepared from the components described in Table 2. The performance of the sample compositions of polycarbonate (bisphenol-A polycarbonate), polycarbonate-siloxane copolymer (polycarbonate-siloxane block copolymer with 20% siloxane content), resorcinol diphosphate as the flame retardant comprising phosphorus, and talc were tested with performance carbon fibers or standard carbon fibers. The sample composition also included a pentaerythritol tetrastearate, a mold release agent. The sample compositions were produced through extrusion compounding, with the carbon fiber provided as chopped feedstock. The sample compositions demonstrated acceptable ductility and strength as measured by the flexural strength and the flexural modulus. Specific gravity was measured to characterize the sample.

Table 2 provides a performance comparison of inventive examples 7-11. The flame retardant properties were measured using the UL94 flammability test with a sample width of 0.8 mm. A rating of V-0 demonstrates that the sample passed the UL94 test protocol.

TABLE 2

| Sample characteristics | Units | 7 | 8 | 9 | 10 | 11 |
|---|---|---|---|---|---|---|
| Polycarbonate | % | 52.3 | 52.3 | 54.4 | 53.4 | 52.4 |
| PC-siloxane copolymer | % | 11.1 | 11.1 | 12 | 12 | 12 |
| Carbon fiber, performance | % | 20 | | 20 | 20 | 20 |
| Carbon fiber, standard | % | | 20 | | | |
| Resorcinol diphosphate | % | 13 | 13 | 10 | 11 | 12 |
| Talc | % | 2.7 | 2.7 | 2.7 | 2.7 | 2.7 |
| Drip suppressant concentrate | % | 0.6 | 0.6 | 0.6 | 0.6 | 0.6 |
| Pentaerythritol tetrastearate | % | 0.3 | 0.3 | 0.3 | 0.3 | 0.3 |
| Specific gravity | — | 1.33 | 1.31 | 1.32 | 1.32 | 1.32 |
| Flexural strength | MPa | 287 | 227 | 258 | 266 | 261 |
| Flexural modulus | MPa | 19000 | 14000 | 18500 | 18700 | 18500 |
| UL94 flammability @ 0.8 mm | | V-0 | V-0 | V-0 | V-0 | V-0 |

Examples 12-13

As a non-limiting example, sample compositions were prepared from the components described in Table 3. The performance of the sample compositions of polycarbonate (bisphenol-A polycarbonate), polycarbonate-siloxane copolymer (polycarbonate-siloxane block copolymer with 20% siloxane content), resorcinol diphosphate as the flame retardant comprising phosphorus, and talc were tested with long, roving, performance carbon fibers. The sample compositions were produced through pultrusion compounding, with the carbon fiber provided as continuous feedstock. The carbon fiber length prior to injection molding was equal to the length of the chopped pellet. These samples were molded into 6 inch by 8 inch (15.24 centimeters (cm) to 20.32) plaques of 0.8 mm thickness. The sample compositions demonstrated acceptable ductility and strength as measured by the flexural strength and the flexural modulus. Specific gravity was measured to characterize the sample.

Table 3 provides a performance comparison of inventive examples 12-13. The flame retardant properties were measured using the UL94 flammability test with a sample width of 0.8 mm. A rating of V-0 demonstrates that the sample passed the UL94 test protocol.

TABLE 3

| Sample characteristics | Units | 12 | 13 |
|---|---|---|---|
| Polycarbonate | % | 52.6 | 55 |
| PC-siloxane copolymer | % | 10.8 | 9.9 |
| Carbon fiber, performance, roving | % | 20 | 20 |
| Resorcinol diphosphate | % | 13 | 11.5 |
| Talc | % | 2.7 | 2.7 |
| Drip suppressant concentrate | % | 0.6 | 0.6 |
| Pentaerythritol tetrastearate | % | 0.3 | 0.3 |
| Specific gravity | — | 1.31 | 1.31 |
| Flexural strength | MPa | 256 | 244 |
| Flexural modulus | MPa | 17800 | 18200 |
| UL94 flammability @ 0.8 mm | | V-0 | V-0 |

Examples 14-17

As a non-limiting example, sample compositions were prepared from the components described in Table 4. The performance of the sample compositions of polycarbonate (bisphenol-A polycarbonate), performance carbon fibers, resorcinol diphosphate as the flame retardant comprising phosphorus, and talc were tested with and without the addition of polycarbonate-siloxane copolymer (polycarbonate-siloxane block copolymer with 20% siloxane content). The sample composition also included hindered phenol stabilizer (antioxidant), phosphite stabilizer (heat stabilizer), and PC-black concentrate (colorant). The sample compositions were produced through extrusion compounding, with the carbon fiber provided as a chopped fiber. The sample compositions demonstrated acceptable ductility and strength as measured by the tensile strength, the flexural strength, and the flexural modulus. Specific gravity was measured to characterize the sample.

Table 4 provides a performance comparison of inventive example 14 to comparative example 15 and inventive example 16 to comparative example 17. The flame retardant properties were measured using the UL94 flammability test with a sample width of 0.8 mm. A rating of V-0 demonstrates that the sample passed the UL94 test protocol. The addition of the polycarbonate-siloxane copolymer demonstrated improved impact strength as measured by notched Izod impact and unnotched Izod impact when comparing inventive example 14 to comparative example 15 and inventive example 16 to comparative example 17.

TABLE 4

| Sample characteristics | Units | 14 | 15 | 16 | 17 |
|---|---|---|---|---|---|
| Polycarbonate | % | 52.4 | 64.4 | 44.4 | 54.4 |
| PC-siloxane copolymer | % | 12 | | 10 | |
| Carbon fiber, performance | % | 20 | 20 | 30 | 30 |
| Resorcinol diphosphate | % | 11 | 11 | 11 | 11 |
| Talc | % | 2.5 | 2.5 | 2.5 | 2.5 |
| Drip suppressant concentrate | % | 0.6 | 0.6 | 0.6 | 0.6 |
| Pentaerythritol tetrastearate | % | 0.3 | 0.3 | 0.3 | 0.3 |
| Hindered phenol stabilizer | % | 0.1 | 0.1 | 0.1 | 0.1 |
| Phosphite stabilizer | % | 0.1 | 0.1 | 0.1 | 0.1 |
| PC-black concentrate | % | 1 | 1 | 1 | 1 |
| Specific gravity | — | 1.32 | 1.327 | 1.369 | 1.376 |
| Tensile strength | MPa | 189 | 193 | 192 | 189 |
| Flexural strength | MPa | 262 | 256 | 270 | 258 |
| Flexural modulus | MPa | 18300 | 18300 | 24600 | 25700 |
| Notched Izod impact | J/m | 72.7 | 56.9 | 66.8 | 50.6 |
| Unnotched Izod impact | J/m | 577 | 568 | 509 | 475 |
| UL94 flammability @ 0.8 mm | — | V-0 | V-0 | V-0 | V-0 |

Examples 18-19

As a non-limiting example, sample compositions were prepared from the components described in Table 5. The performance of the sample compositions of polycarbonate (bisphenol-A polycarbonate), polycarbonate-siloxane copolymer (polycarbonate-siloxane block copolymer with 20% siloxane content), performance carbon fibers, and talc were tested with phosphazine as the flame retardant comprising phosphorus. The sample compositions were produced through extrusion compounding, with the carbon fiber provided as a chopped fiber. The sample compositions demonstrated acceptable ductility and strength as measured by the tensile strength, the flexural strength, the flexural modulus, and the notched and unnotched izod impact tests. Specific gravity was measured to characterize the sample.

Table 5 provides a performance comparison of inventive examples 18-19. The flame retardant properties were measured using the UL94 flammability test with a sample width of 0.8 mm. A rating of V-0 demonstrates that the sample passed the UL94 test protocol.

TABLE 5

| Sample characteristics | Units | 18 | 19 |
|---|---|---|---|
| Polycarbonate | % | 56.4 | 51.4 |
| PC-siloxane copolymer | % | 10 | 15 |
| Carbon fiber, performance | % | 20 | 20 |
| Phosphazene | % | 8 | 8 |
| Talc | % | 2.5 | 2.5 |
| Drip suppressant concentrate | % | 0.6 | 0.6 |
| PETS | % | 0.3 | 0.3 |
| Hindered phenol stabilizer | % | 0.1 | 0.1 |
| Phosphite stabilizer | % | 0.1 | 0.1 |
| PC-black concentrate | % | 2 | 2 |
| Specific Gravity-Avg | — | 1.3 | 1.299 |
| Tensile strength | MPa | 162 | 156 |
| Flexural strength | MPa | 241 | 230 |
| Flexural modulus | MPa | 16000 | 16100 |
| Notched Izod impact | J/m | 79.5 | 74.9 |
| Unnotched Izod impact | J/m | 624 | 559 |
| UL94 flammability @ 0.8 mm | — | V-0 | V-0 |

Examples 20-22

As a non-limiting example, sample compositions were prepared from the components described in Table 6. The performance of the sample compositions of polycarbonate, performance carbon fibers or standard carbon fibers, resorcinol diphosphate as the flame retardant comprising phosphorus, and talc were tested at various sample thicknesses and with and without the addition of polycarbonate-siloxane copolymer (polycarbonate-siloxane block copolymer with 20% siloxane content). The sample compositions were produced through extrusion compounding, with the carbon fiber provided as a chopped fiber. The sample compositions demonstrated acceptable tensile strength, flexural strength, flexural modulus, and impact strength as shown by the notched and unnotched Izod impact tests. Specific gravity was measured to characterize the sample.

Table 6 provides a performance comparison of inventive example 20 with comparative examples 21 and 22. The flame retardant properties were measured using the UL94 flammability test with a sample width of 1.0 mm or 0.8 mm. A rating of V-0 demonstrates that the sample passed the UL94 test protocol. A rating of V-1 or V-2 demonstrates inferior fire retardant properties.

TABLE 6

| Sample characteristics | Units | 20 | 21 | 22 |
|---|---|---|---|---|
| PC-sebacic acid copolymer | % | 46.4 | 63.4 | 63.4 |
| PC-siloxane copolymer | % | 16 | | |
| Carbon fiber, performance | % | 20 | 20 | |
| Carbon fiber, standard | | | | 20 |
| Resorcinol diphosphate | % | 13 | 13 | 13 |
| Talc | % | 2.7 | 2.7 | 2.7 |
| Drip suppressant concentrate | % | 0.6 | 0.6 | 0.6 |
| PETS | % | 0.3 | 0.3 | 0.3 |
| PC-black concentrate | % | 1 | | |
| Specific gravity | — | 1.317 | 1.323 | 1.327 |
| Tensile strength | MPa | 168 | 188 | 151 |
| Flexural strength | MPa | 232 | 262 | 219 |
| Flexural modulus | MPa | 18100 | 18400 | 14200 |
| Notched Izod impact | J/m | 61.1 | 66.4 | 46.1 |
| Unnotched Izod impact | J/m | 443 | 567 | 452 |
| UL94 flammability @ 1.0 mm | — | V-0 | V-0 | V-2 |
| UL94 flammability @ 0.8 mm | — | V-0 | V-1 | V-2 |

Examples 23-30

As a non-limiting example, sample compositions were prepared from the components described in Table 7. The performance of the sample compositions of polycarbonate-siloxane copolymer (polycarbonate-siloxane block copolymer with 20% siloxane content), performance carbon fibers, and talc were tested with phosphazine or aryl phosphate as the flame retardant comprising phosphorus. The samples were also tested with polycarbonate (bisphenol-A polycarbonate), branched polycarbonate, or polycarbonate-sebacic acid copolymer or a combination thereof. The sample compositions include a chain extender comprising a low molecular weight styrene-acrylate-epoxy. Various widths of the samples were used when testing the flame retardant properties as measured by UL94 flammability test. The sample compositions were produced through extrusion compounding, with the carbon fiber provided as a chopped fiber. The sample compositions demonstrated acceptable ductility and strength as measured by the tensile strength, the flexural strength, the flexural modulus, and the notched and unnotched Izod impact tests. Specific gravity was measured to characterize the sample.

Table 7 provides a performance comparison of inventive examples 23-30. The flame retardant properties were measured using the UL94 flammability test with a sample width of 1.0 mm, 0.8 mm, 0.6 mm, and 0.4 mm. A rating of V-0 demonstrates that the sample passed the UL94 test protocol.

TABLE 7

| Sample characteristics | Units | 23 | 24 | 25 | 26 | 27 | 28 | 29 | 30 |
|---|---|---|---|---|---|---|---|---|---|
| PC-sebacic acid copolymer | % | 46.95 | 25 | 25 | 25 | 25 | 15 | 37.2 | 34.7 |
| Polycarbonate | % | | 21.2 | 21.5 | 11.7 | 13.7 | 23.7 | | |
| PC-siloxane copolymer | % | 15 | 17 | 17 | 17 | 15 | 15 | 17 | 17 |
| Branched polycarbonate | % | | | | 10 | 10 | 10 | 10 | 10 |
| Carbon fiber, performance | % | 25 | 25 | 25 | 25 | 25 | 25 | 25 | 25 |
| Phosphazene | % | | 8 | 8 | 8 | 8 | 8 | | |
| Aryl phosphate | % | 10 | | | | | | 10 | 10 |
| Talc | % | 2 | 3 | 2.7 | 2.5 | 2.5 | 2.5 | | 2.5 |
| PETS | % | 0.3 | 0.3 | 0.3 | 0.3 | 0.3 | 0.3 | 0.3 | 0.3 |
| Chain extender | % | 0.1 | 0.1 | 0.1 | 0.1 | 0.1 | 0.1 | 0.1 | 0.1 |
| Drip suppressant concentrate | % | 0.4 | 0.4 | 0.4 | 0.4 | 0.4 | 0.4 | 0.4 | 0.4 |
| Phosphite stabilizer | % | 0.1 | | | | | | | |
| Hindered phenol stabilizer | % | 0.15 | | | | | | | |
| Specific gravity | — | 1.32 | 1.32 | 1.3 | 1.31 | 1.31 | 1.31 | 1.3 | 1.32 |
| Tensile strength | MPa | 184 | 189 | 159 | 163 | 165 | 164 | 176 | 172 |
| Flexural strength | MPa | 263 | 276 | 238 | 246 | 253 | 251 | 262 | 262 |
| Flexural modulus | MPa | 19700 | 19600 | 18900 | 19200 | 19700 | 19400 | 19500 | 20100 |
| Notched Izod impact | J/m | 72 | 82.9 | 74.1 | 82.5 | 80.6 | 77.6 | 74 | 73.4 |
| Unnotched Izod impact | J/m | 458 | 531 | 503 | 470 | 508 | 472 | 507 | 538 |
| UL94 flammability @ 1.0 mm | — | V-0 | V-0 | V-0 | V-0 | V-0 | V-0 | V-0 | V-0 |
| UL94 flammability @ 0.8 mm | — | V-0 | V-0 | V-0 | V-0 | V-0 | V-0 | V-0 | V-0 |
| UL94 flammability @ 0.6 mm | — | — | — | V-0 | V-0 | V-0 | V-0 | V-0 | V-0 |
| UL94 flammability @ 0.4 mm | — | — | — | V-0 | V-0 | V-0 | V-0 | V-0 | V-0 |

Example 31

The materials shown in Table 8 were used to prepare the compositions described in Tables 10 and 12, and evaluated herein.

TABLE 8

| Component | Chemical description | Source |
|---|---|---|
| PC1 | BPA polycarbonate resin made by an interfacial process with MVR at 300° C./1.2 kg of about 5 to about 7 mL/10 min. | SABIC Innovative Plastics ("SABIC I.P.") |
| PC2 | Optical quality (OQ) BPA polycarbonate resin (with phenol endcap), MVR at 300° C./1.2 kg of about 60 to about 80 mL/10 min; Mw of about 17700. | SABIC I.P. |
| PC3 | Branched BPA polycarbonate resin made by the interfacial process having a weight average molecular weight (Mw) of 37700 and MVR at 300° C./1.2 kg of about 1 to about 4 mL/10 min. | SABIC I.P. |
| MET | Methyl methacrylate polymer with butyl acrylate and dimethylsiloxane (CAS 143106-82-5); available under the trade name Metablen S-2001. | Mitsubishi Corp. (HK), Ltd. |
| TALC | Surface- modified talc (magnesium silicate hydrate) with a mean particle size of 1.8 microns; available under the trade name Luzenac ® R7. | Imerys |
| WOLL | Wollastonite with median fiber diameter of about 4.5 μm and length of about 50 μm; available under the trade name Nyglos ® 4W 10992. | Nyco Minerals, Inc. |
| GLF | Chopped E-glass fiber with an average length of 4.5 mm and an average diameter of 13 microns; available under the trade name ECS03T-120/PL. | Nippon Electric Glass Co., Ltd. |

TABLE 8-continued

| Component | Chemical description | Source |
|---|---|---|
| FR1 | Aromatic cyclic phosphazene-containing flame retardant with chemical formula $(C_{12}H_{10}NPO_2)_n$, wherein n is about 3 to about 6; commercially available under the trade name Rabitle FP-110. | Fushimi Pharmaceutical Co., Ltd. |
| FR2 | Bisphenol A bis(diphenylphosphate), CAS Reg. No. 181028-79-5; available under the trade name CR-41. | Daihachi Chemical Industry Co., Ltd. |
| FR3 | Oligomeric solid phosphate ester flame retardant with a melting point of about 101-108° C.; available under the trade name Fyrolflex SOL-DP. | ICL Industrial Products |
| ABS | Bulk acrylonitrile-butadiene-styrene comprising about 16-17 wt % butadiene content. | SABIC I.P. |
| PET | Polyester homopolymer with I.V. of about 0.800 dl/g when determined at 25° C. in a mixed solvent of phenol/tetrachloroethane (1:1 by weight); available under the trade name BG-03-80. | Foshan Honghua Polyester Chip Co., Ltd. |
| PS | Polystyrene (CAS 9003-53-6) with a melt flow rate (MFR) of about 8.5 when tested in accordance with ASTM D1238 at 200° C. under a 5 kg load; available under the trade name Styron 680A. | Styron (Hong Kong) Limited |
| SO | Organomodified siloxane comprising a polycaprolactone-polydimethylsiloxane-polycaprolactone triblock copolymer having a Mw of about 22,000 AMU and a polydimethylsiloxane content of about 44 wt %; commercially available under the trade name Tegomer H-Si 6440P. | Evonik Goldschmidt Gmbh |
| TSAN | Styrene-acrylonitrile copolymer encapsulated polytetrafluoroethylene. | SABIC I.P. |
| AO1 | Hindered phenol, Irganox 1076. | CIBA SPECIALITY CHEMICALS |
| AO2 | Tris(2,4-di-tert-butylphenyl)phosphite, stabilizer. | EVERSPRING CHEMICAL CO LTD |

All samples were prepared by melt extrusion on a Toshiba Twin screw extruder, using a nominal melt temperature of 260° C. and operated at 400 revolutions per minute (rpm). Melt Volume Rate ("MVR") was determined at 260° C. under a 2.16 kg load, over 10 minutes, in accordance with ASTM D1238. Each reported value is an average value of three tested specimens. Results are reported in cubic centimeters ($cm^3$) per 10 minutes. Notched Izod Impact Strength ("NII") was used to compare the impact resistances of plastic materials and was determined in accordance with ASTM D256 at 23° C. with a 5.5 Joule hammer using 3.2 mm thick notched Izod bars The ASTM results are defined as the impact energy in joules used to break the test specimen, divided by the specimen area at the notch. Results are reported in J/m. Flexural testing was carried out at 1.27 millimeters per minute (mm/min) in accordance with ASTM D790.

Flammability tests following the procedure of Underwriter's Laboratory Bulletin 94 (UL94) classified results as either UL94 V0, UL94 V1, or UL94 V2 on the basis of the test results obtained for five samples. Multiple specimens (either 5 or 10) are tested per thickness. Some specimens are tested after conditioning for 48 hours at 23° C., 50% relative humidity. The other specimens are tested after conditioning for 168 hours at 70° C. The bar is mounted with the long axis vertical for flammability testing. The specimen is supported such that its lower end is 9.5 mm above the Bunsen burner tube. A blue 19 mm high flame is applied to the center of the lower edge of the specimen for 10 seconds. The time until the flaming of the bar ceases is recorded (T1). If burning ceases, the flame is re-applied for an additional 10 seconds. Again, the time until the flaming of the bar ceases is recorded (T2). If the specimen drips particles, these shall be allowed to fall onto a layer of untreated surgical cotton placed 305 mm below the specimen.

V0: In a sample placed so that its long axis is 180 degrees to the flame, the maximum period of flaming and/or smoldering after removing the igniting flame does not exceed 10 seconds and none of the vertically placed samples produces drips of burning particles that ignite absorbent cotton, and no specimen burns up to the holding clamp after flame or after glow.

The data were also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$p(\text{FTP}) = (P_{t1>mbt,n=0} \times P_{t2>mbt,n=0} \times P_{total<=mbt} \times P_{drip,n=0}),$$

where $P_{t1>mbt, n=0}$ is the probability that no first burn time exceeds a maximum burn time value, $P_{t2>mbt, n=0}$ is the probability that no second burn time exceeds a maximum burn time value, $P_{total<=mbt}$ is the probability that the sum of the burn times is less than or equal to a maximum total burn time value, and $P_{drip, n=0}$ is the probability that no specimen exhibits dripping during the flame test. First and second burn time refer to burn times after a first and second application of the flame, respectively.

The probability that no first burn time exceeds a maximum burn time value, $P_{t1>mbt, n=0}$, may be determined the formula:

$$P_{t1>mbt,n=0} = (1 - P_{t1>mbt})^5,$$

where $P_{t1>mbt}$ is the area under the log normal distribution curve for t1>mbt, and where the exponent "5" relates to the number of bars tested. The probability that no second burn time exceeds a maximum burn time value may be determined from the formula:

$$P_{t2>mbt,n=0}=(1-P_{t2>mbt})^5,$$

where $P_{t2>mbt}$ is the area under the normal distribution curve for t2>mbt. As above, the mean and standard deviation of the burn time data set are used to calculate the normal distribution curve. For the UL-94 V0 rating, the maximum burn time is 10 seconds. For a V1 or V2 rating the maximum burn time is 30 seconds. The probability $P_{drip, n=0}$ that no specimen exhibits dripping during the flame test is an attribute function, estimated by:

$$P_{drip,n=0}=(1-P_{drip})^5,$$

where $P_{drip}$=(the number of bars that drip/the number of bars tested).

The probability $P_{total<=mtbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total≤maximum total burn time. For the UL-94 V0 rating, the maximum total burn time is 50 seconds. For a V1 or V2 rating, the maximum total burn time is 250 seconds. Surface appearance was checked using the molding conditions shown in Table 9.

TABLE 9

| Condition | Units | |
|---|---|---|
| Pre-drying time | hrs | 4 |
| Pre-drying temp | °C. | 85 |
| Zone 1 temp | °C. | 260 |
| Zone 2 temp | °C. | 270 |
| Zone 3 temp | °C. | 270 |
| Nozzle temp | °C. | 265 |
| Mold temp | °C. | 70 |

Exemplary formulations were prepared as described in Table 10 using the materials described in Table 1, wherein all amounts are given in wt %. Data for performance of the formulations in various tests are shown in Table 11. The data show that compositions comprising 15 wt % wollastonite, 10 wt % talc and 3 wt % glass fiber had very distinct performance results depending upon the nature of the filler, e.g. compare FR2 and FR3 individually vs. compositions comprising both FR1 and FR2 or FR2 and FR3. As can be seen from Sample #1 and #2 comprising, respectively, FR2 and FR3 with different loading, but comparable phosphor content, FR3 was superior in both impact strength and flame retardance efficiency compared to FR2. Moreover, the combination of FR2 and FR1 or FR2 and FR3 provided a synergistic effect, i.e. see Sample #3 and #4, with robust impact and flame retardance abilities provided by these combinations.

TABLE 10

| Component | #1 | #2 | #3 | #4 |
|---|---|---|---|---|
| PC1 | 20.24 | 21.64 | 21.64 | 21.64 |
| PC2 | 15 | 15 | 15 | 15 |
| PC3 | 15 | 15 | 15 | 15 |
| MET | 2.5 | 2.5 | 2.5 | 2.5 |
| TALC | 10 | 10 | 10 | 10 |
| WOLL | 15 | 15 | 15 | 15 |
| GLF | 3 | 3 | 3 | 3 |
| FR1 | — | — | — | 6 |
| FR2 | 10.4 | — | 3 | 3 |
| FR3 | — | 9 | 6 | — |
| ABS | 5 | 5 | 5 | 5 |

TABLE 11

| | Units | #1 | #2 | #3 | #4 |
|---|---|---|---|---|---|
| Flexural Modulus | MPa | 6860 | 6650 | 6720 | 6680 |
| Modulus of Elasticity | MPa | 6190 | 6044 | 6060 | 6212 |
| Tensile Stress | MPa | 56 | 55 | 55 | 54 |
| Notched Impact Strench, 23° C. | J/m | 65 | 76 | 70 | 82 |
| MFR, 260° C., 2.16 Kg | g/10 min | 8.2 | 6.9 | 7.6 | 6.3 |
| App. Viscosity, 270° C., 1500 s$^{-1}$ | Pa*s | 158 | 177 | 157 | 179 |
| Flame retardancy (UL 94, thickness 1.2 mm) | — | None | V1 | V1 | V0 |

Additional formulations were prepared and tested (see Table 12 for formulation information and Table 13 for data obtained for formulations of Table 12). The additional formulations further depicted the performance of such reinforced polycarbonate compositions with the addition of various surface enhancers. As can be seen, compared to Samples #5 and #7, which contained no surface enhancer, ABS, PET, PS and organomodified siloxane, all manifested the function of improved surface appearance such as gate splay and glass floating, which are very important aspects for customer judgment on the appearance of molded part with highly filled materials. At the same time, there is still a good balance of material properties, for example, high modulus (7000-8000 MPa) and good notched impact strength to meet the target application needs.

TABLE 12

| Component | #5 | #6 | #7 | #8 | #9 | #10 |
|---|---|---|---|---|---|---|
| PC1 | 23.64 | 18.64 | 24.64 | 19.64 | 19.64 | 24.14 |
| PC2 | 15 | 15 | 15 | 15 | 15 | 15 |
| PC3 | 15 | 15 | 15 | 15 | 15 | 15 |
| MET | 2.5 | 2.5 | 2.5 | 2.5 | 2.5 | 2.5 |
| TALC | 10 | 10 | — | — | — | — |
| WOLL | 15 | 15 | 15 | 15 | 15 | 15 |
| GLF | 6 | 6 | 15 | 15 | 15 | 15 |
| FR1 | 6 | 6 | 6 | 6 | 6 | 6 |
| FR2 | 3 | 3 | 3 | 3 | 3 | 3 |
| ABS | — | 5 | — | — | — | — |
| PET | — | — | — | 5 | — | — |
| PS | — | — | — | — | 5 | — |
| SO | — | — | — | — | — | 0.5 |

TABLE 13

| | Unit | #5 | #6 | #7 | #8 | #9 | #10 |
|---|---|---|---|---|---|---|---|
| Flexural Modulus | MPa | 7370 | 7310 | 7530 | 7660 | 7890 | 7420 |
| Modulus of Elasticity | MPa | 6884 | 6683 | 7303 | 7972 | 7782 | 6981 |
| Tensile Stress | MPa | 64 | 62 | 78 | 81 | 82 | 75 |
| Notched Impact Strench, 23° C. | J/m | 71 | 65 | 99 | 81 | 83 | 99 |
| MFR, 260° C., 2.16 kg | g/10 min | 8.6 | 7.9 | 9.2 | 10.8 | 11.8 | 10.3 |
| App. Viscosity, 270° C., 1500 s$^{-1}$ | Pa*s | 179 | 151 | 223 | 219 | 127 | 196 |
| Flame retardancy (UL94, thickness 1.2 mm) | — | V0 | V1 | V0 | V0 | V0 | V0 |
| Surface Appearance | — | Severe splay | Obvious decreased splay | Severe splay and glass floating | Decreased glass floating | Notably decreased splay and glass floating | Obvious decreased splay and glass floating |

The disclosed formulations described hereinabove provide high ductility in terms of notched Izod impact strength (≥80 J/m), high flexural modulus (≥7400 MPa), good flow (MFR≥9 g/10 min at 260° C. under a 2.16 kg load), and outstanding thin wall flame retardance performance (V0<1.2 mm wall thickness). The demonstrated characteristics of the disclosed formulations make them well-suited for using articles of manufacture in the electric and electronic markets.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A polymer composition comprising:
a polycarbonate polymer present in an amount of about 20 weight % to about 80 weight % relative to the total weight of the polymer composition;
a polycarbonate-siloxane copolymer present in an amount of about 1 weight % to about 20 weight % relative to the total weight of the polymer composition;
a reinforcing filler comprising carbon fiber, the reinforcing filler present in an amount of about 15 weight % to about 35 weight % relative to the total weight of the polymer composition; and
a flame retardant present in an amount of about 4 weight % to about 20 weight % relative to the total weight of the polymer composition, wherein the flame retardant comprises phosphorus,
wherein the combined weight percent value of all components does not exceed about 100 wt %, and
wherein the polymer composition demonstrates a flexural modulus in an amount equal to or greater than about 10 GPa.

2. The polymer composition claim 1, wherein the polycarbonate polymer comprises an aromatic polycarbonate, a polycarbonate-sebacic acid copolymer, or a branched polycarbonate, or a combination thereof, in an amount of about 5 weight % to about 30 weight % relative to the total weight of the polymer composition.

3. The polymer composition of claim 1, wherein the reinforcing filler comprises a standard carbon fiber, a performance carbon fiber, or a long carbon fiber, or a combination thereof; and, optionally, glass fiber.

4. The polymer composition of claim 1, wherein the flame retardant comprises phosphazene, aryl phosphate, bisphenol A disphosphate, resorcinol bis-diphenylphosphate, bisphenol A diphenyl phosphate, or resorcinol diphosphate, or a combination thereof.

5. The polymer composition of claim 1, further comprising talc present in an amount of about 0.1 weight % to about 5 weight % relative to the total weight of the polymer composition.

6. The polymer composition of claim 1, wherein the polymer composition demonstrates a flexural modulus in an amount equal to or greater than about 14 GPa.

7. The polymer composition of claim 1, having a notched Izod impact strength of greater than or equal to 60 J/m.

8. The polymer composition of claim 1, being capable of achieving UL94 V0 rating at a thickness of about 0.8 mm to about 1.0 mm.

9. A method comprising:
forming a polymer composition, wherein the polymer composition comprises:
a polycarbonate polymer present in an amount of about 20 weight % to about 80 weight % relative to the total weight of the polymer composition;
a polycarbonate-siloxane copolymer present in an amount of about 1 weight % to about 20 weight % relative to the total weight of the polymer composition;
a reinforcing filler comprising carbon fiber, the reinforcing filler present in an amount of about 15 weight % to about 35 weight % relative to the total weight of the polymer composition; and a flame retardant present in an amount of about 4 weight % to about 20 weight % relative to the total weight of the polymer composition, wherein the flame retardant comprises phosphorus, wherein the combined weight percent value of all components does not exceed about 100 wt %%, and wherein the polymer composition demonstrates a flexural modulus in an amount equal to or greater than about 10 GPa.

10. The method of claim 9, wherein the polycarbonate polymer comprises an aromatic polycarbonate, a polycarbonate-sebacic acid copolymer, or a branched polycarbonate, or a combination thereof, in an amount of about 5 weight % to about 30 weight % relative to the total weight of the polymer composition.

11. The method of claim 9, wherein the reinforcing filler comprises a standard carbon fiber, a performance carbon fiber, or a long carbon fiber, or a combination thereof and, optionally, glass fiber.

12. The method of claim 9, wherein the flame retardant comprises phosphazene, aryl phosphate, bisphenol A disphosphate, resorcinol bis-diphenylphosphate, bisphenol A diphenyl phosphate, or resorcinol diphosphate, or a combination thereof.

13. A blended thermoplastic composition comprising:
about 30 wt % to about 75 wt % of a polycarbonate component;
greater than 0 wt % to about 10 wt % of an impact modifier component;
about 15 wt % to about 40 wt % of a filler component comprising carbon fiber;
about 5 wt % to about 20 wt % of a flame retardant component; and
about 0.5 wt % to about 10 wt % of a surface enhancer component;
wherein the combined weight percent value of all components does not exceed about 100 wt %;
wherein all weight percent values are based on the total weight of the composition %, and
wherein the blended thermoplastic composition demonstrates a flexural modulus in an amount equal to or greater than about 10 GPa.

14. The blended thermoplastic composition of claim 13, wherein the polycarbonate component is a homopolymer comprising repeating units derived from bisphenol-A.

15. The blended thermoplastic composition of claim 13, wherein the polycarbonate has a weight average molecular weight of about 15,000 to about 50,000 grams/mole, as measured by gel permeation chromatography using bisphenol-A polycarbonate standards.

16. The blended thermoplastic composition of claim 13 comprising: about 30 wt % to about 75 wt % of a polycarbonate component; greater than 0 wt % to about 10 wt % of an impact modifier component; about 15 wt % to about 40 wt % of a filler component; about 5 wt % to about 20 wt % of a flame retardant component; and about 0.5 wt % to about 10 wt % of a surface enhancer component; wherein the combined weight percent value of all components does not exceed about 100 wt %; wherein all weight percent values are based on the total weight of the composition.

17. The blended thermoplastic composition of claim 13, wherein the blended thermoplastic composition has a notched Izod impact strength greater than or equal to about 60 Jim when tested in accordance with ASTM D256.

18. The blended thermoplastic composition of claim 13, wherein a molded sample comprising the blended thermoplastic composition is capable of achieving UL94 V0 rating at a thickness of 1.0 mm (±10%).

19. The blended thermoplastic composition of claim 13, wherein a molded sample comprising the blended thermoplastic composition is capable of achieving UL94 V0 rating at a thickness of 1.5 mm (±10%).

20. The blended thermoplastic composition of claim 13, wherein a molded sample comprising the blended thermoplastic composition has a flexural modulus greater than or equal to about 5000 MPa when tested in accordance with ASTM D790 and having a melt flow rate (MFR) of greater than or equal to about 8 g/10 min when tested in accordance with ASTM D1238 at 260° C. under a load of 2.16 kg.

* * * * *